United States Patent
Lin et al.

(10) Patent No.: US 8,448,011 B2
(45) Date of Patent: May 21, 2013

(54) INCREASING PROCESSOR OPERATING FREQUENCY WHEN MONITORED LOADING LEVEL PATTERN OF PROGRAM MATCHES RECORDED PATTERN OF TARGET PROGRAM

(75) Inventors: Bing Min Lin, Taipei (TW); Chih Shien Lin, Taipei (TW); Chih Yung Peng, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 384 days.

(21) Appl. No.: 12/844,498

(22) Filed: Jul. 27, 2010

(65) Prior Publication Data

US 2011/0022874 A1    Jan. 27, 2011

(30) Foreign Application Priority Data

Jul. 27, 2009  (TW) ............................... 98125220 A

(51) Int. Cl.
*G06F 1/08*  (2006.01)
(52) U.S. Cl.
USPC ........................................ 713/600; 713/500
(58) Field of Classification Search
None
See application file for complete search history.

(56) References Cited

U.S. PATENT DOCUMENTS

| 6,768,708 | B1 | 7/2004 | Ogata et al. | |
|---|---|---|---|---|
| 6,987,399 | B2 | 1/2006 | Lee | |
| 7,594,128 | B2* | 9/2009 | Bacchus et al. | 713/300 |
| 2006/0242433 | A1* | 10/2006 | Fu et al. | 713/300 |
| 2011/0113274 | A1* | 5/2011 | Burchard et al. | 713/322 |

FOREIGN PATENT DOCUMENTS

CN          1851579 A    10/2006

* cited by examiner

*Primary Examiner* — Kenneth Kim
(74) *Attorney, Agent, or Firm* — Muncy, Geissler, Olds & Lowe, PLLC

(57) ABSTRACT

A data processing system and an adjusting method thereof are disclosed. The data processing system includes a processor, a clock generator, a monitoring module and a determining module. When a target program is processed, the monitoring module monitors a first loading level of the processor, and transmits the first loading level to the determining module for recording. Furthermore, when a present program is processed, the monitoring module monitors a second loading level of the processor, and transmits the second loading level to the determining module. The determining module determines whether the second loading level matches with the first loading level within a preset period, and if it matches, the determining module generates and transmits a control signal to the clock generator, thereby making the clock generator generates a first clock signal to the processor, so as to increase the operating frequency of the processor.

12 Claims, 5 Drawing Sheets

INCREASING PROCESSOR OPERATING FREQUENCY WHEN MONITORED LOADING LEVEL PATTERN OF PROGRAM MATCHES RECORDED PATTERN OF TARGET PROGRAM

CROSS REFERENCE TO RELATED APPLICATIONS

This Non-provisional application claims priority under 35 U.S.C. §119(a) on Patent Application No(s). 098125220 filed in Taiwan, Republic of China on Jul. 27, 2009, the entire contents of which are hereby incorporated by reference.

BACKGROUND OF THE INVENTION

1. Field of Invention

The invention relates to a data processing system and an adjusting method thereof and, more particularly, to a data processing system and an adjusting method thereof which can increase or decrease the performance of the processor instantly.

2. Related Art

With the development of the operating system and various programs especially game programs, drawing programs and testing programs, a user has higher requires on the operation speed of integrated circuits devices such as a central processing unit (CPU) and a graphics chip. When the user updates or installs a new operating systems or programs, he needs to update the hardware in the data processing system such as the CPU or the graphics processing unit (GPU) therewith to meet the requirement of the operating system or the programs.

Furthermore, the conventional data processing system usually includes a motherboard as an operating platform, and the motherboard mainly includes a CPU, a clock generator, a north bridge chipset and a south bridge chipset disposed thereon. The north bridge chipset further includes a front side bus (FBS) and a peripheral component interface (PCI) bus.

The CPU on the motherboard transmits a control signal to the clock generator, and the clock generator outputs the first clock signal and the second clock signal according to the control signal, and then the motherboard operates. The first clock signal is transmitted to the CPU and the FBS of the north bridge chipset, and the second clock signal is transmitted to the PCI bus of the north bridge chipset and the south bridge chipset.

In the conventional over-clock technique, the frequency of the first clock signal is increased in the permission range of the CPU to increase the operating frequency of the CPU directly. The frequency of the second clock signal also may be increased to increase the operating frequency of the CPU, the PCI bus and the south bridge chipset, thereby increasing the operation speed of the CPU and to meet the requirement of the operating system and programs.

In the conventional, the first clock signal and the second clock signal may be adjusted via hardware or software. For example, the user may adjust a jumper or a switch on the motherboard or modify the setting values of the basic input/output system (BIOS) to adjust the first clock signal and the second clock.

However, regardless of the hardware or the software mode, the operating frequency of the CPU is usually changed frequently in the conventional over-clock modes, and the CPU also may operate at over-high operating frequency for a long time. Therefore, the operating system often works unstable, and the CPU or other elements also may be damaged.

SUMMARY OF THE INVENTION

The invention discloses an adjusting method for adjusting the performance of a data processing system. According to an embodiment, the adjusting method in the invention includes the steps of first, when a target program is executed, monitoring and recording a first loading level of the processor of the data processing system; second, when a present program is executed, monitoring and recording a second loading level of the processor; third, determining whether the second loading level matches with the first loading level in a preset period, and if it matches, increasing the operating frequency of the processor.

The invention also discloses a data processing system. According to an embodiment of the invention, the data processing system includes a processor, a clock generator, a monitoring module and a determining module. In addition, the clock generator and the monitoring module are connected to the processor, respectively, and the determining module is connected to the clock generator and the monitoring module. When the target program is executed, the monitoring module monitors the first loading level of the processor and transmits the first loading level to the determining module to be recorded.

Furthermore, when a present program is executed, the monitoring module monitors a second loading level of the processor and transmits the second loading level to the determining module. The determining module determines whether the second loading level matches with the first loading level in the preset period. If it matches, the determining module transmits a first control signal to the clock generator to make the clock generator generate the first clock signal to the processor to increase the operating frequency of the processor.

These and other features, aspects and advantages of the present invention will become better understood with regard to the following description, appended claims, and accompanying drawings.

DETAILED DESCRIPTION OF THE INVENTION

The invention discloses a data processing system and an adjusting method thereof. The data processing system may be used at desktop computers, notebook computers, game consoles and so on, and it is not limited thereto.

Figure 1:
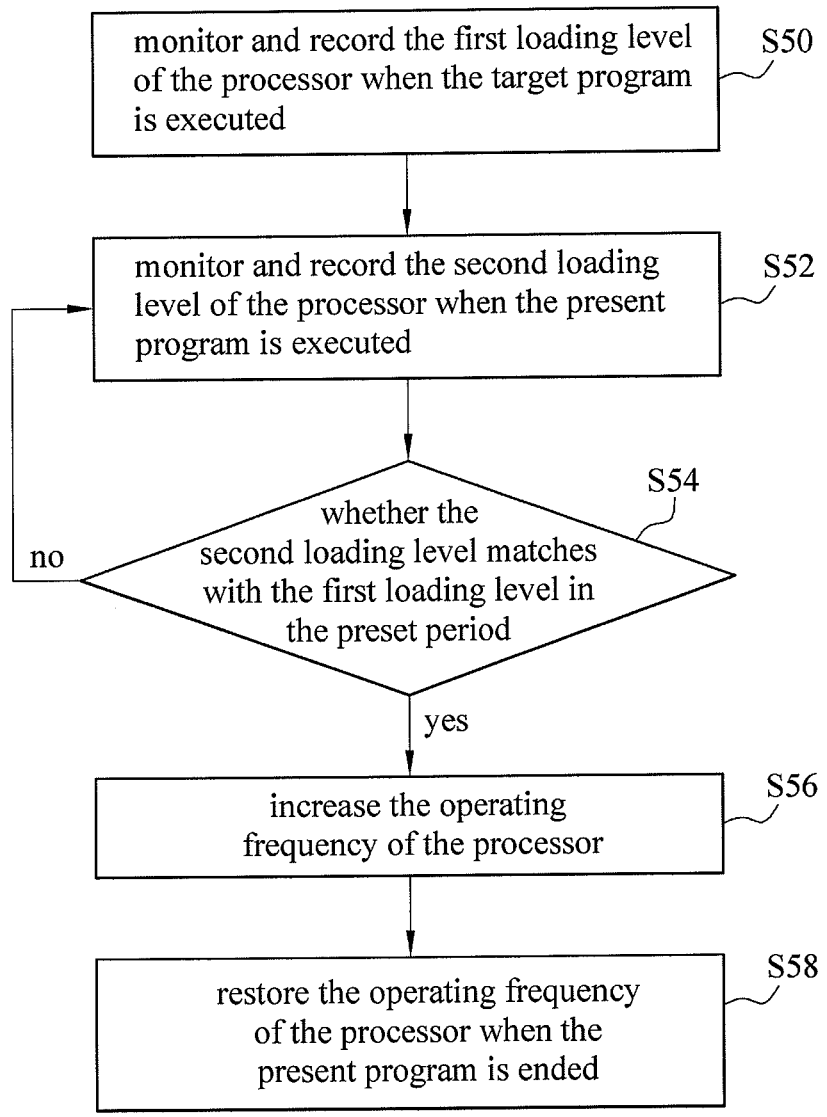
FIG. 1 is a flow chart showing the adjusting method in an embodiment of the invention.

FIG. 1 is a flow chart showing the adjusting method in an embodiment of the invention. The adjusting method in the invention may adjust the performance of the data processing system, and especially adjust the performance of the processor in the data processing system. As shown in FIG. 1, the adjusting method includes the steps as follows.

First, in step S50, when the target program is executed, a first loading level of the processor is monitored and recorded. In practical usage, the target program may be designated by the user, it may be a game program, a drawing program, a testing program and so on, and it is not limited thereto. In addition, the first loading level may be the amount of functions executed by the processor per unit time, or the number of time that the processor accesses a cache unit per unit time, and it is also not limited thereto.

Figure 2A:
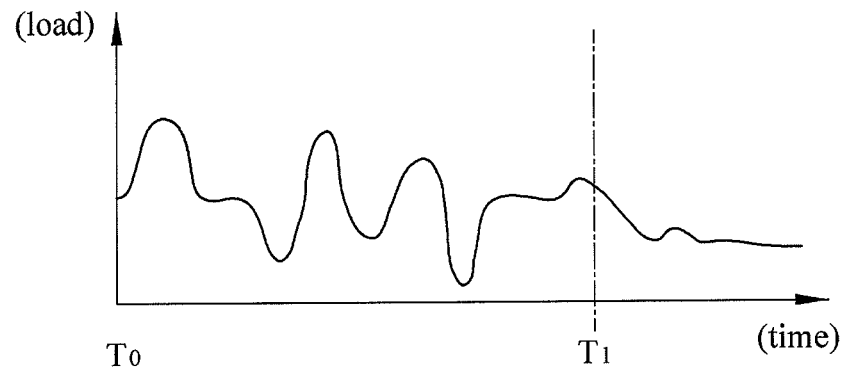
FIG. 2A is a schematic diagram showing the first loading level recorded in step S50 in FIG. 1.

FIG. 2A is a schematic diagram showing the first loading level recorded in step S50 in FIG. 1. As shown in FIG. 1 and FIG. 2A, the target program is started at time $T_0$ and ended at time $T_1$. In practical usage, the loading level of the processor between $T_0$ and $T_1$ may be recoded to be the first loading level in step S50.

Furthermore, in practical usage, when the user wants to execute the target program via the data processing system (at time $T_0$), he may input a start signal via input devices such as the keyboard or the mouse to start the adjusting method in the invention, and then step S50 is performed. In practical usage, when the user ends the target program (at time $T_1$), he may input an end signal via the input device to finish recording the first loading level as shown in FIG. 2A.

Afterwards, in step S52, when the present program is executed, the second loading level of the processor is monitored and recorded. In practical usage, the present program may be the aforementioned game program, the drawing program, the testing program, or a document editing program, a browser program, a dictionary program, an audio/video display program and other programs which may be executed at the data processing system. In addition, the second loading level also may be the amount of functions executed by the processor per unit time, or the number of times that the processor accesses the cache unit per unit time, and it is not limited thereto. The second loading level and the first loading level are preferably recorded in the same way.

Figure 2B:
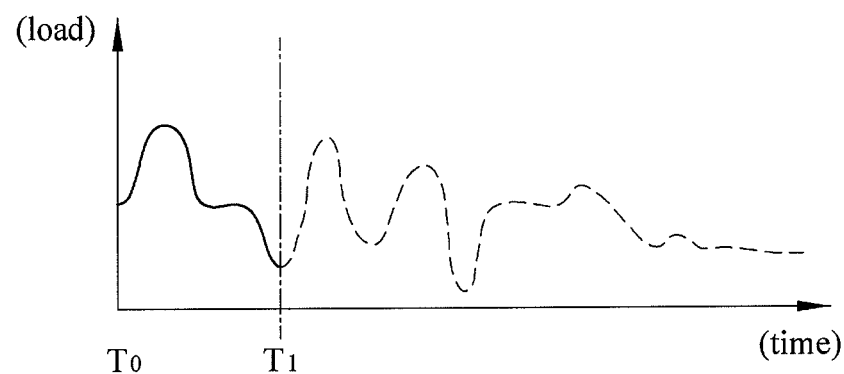
FIG. 2B and FIG. 2C are schematic diagrams showing the second loading level recorded in step S52 in FIG. 1.
Figure 2C:
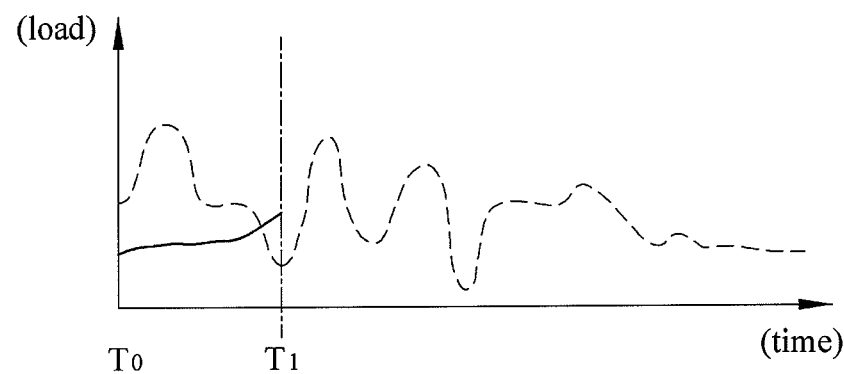

FIG. 2B and FIG. 2C are schematic diagrams showing the second loading level recorded in step S52 in FIG. 1. In practical usage, when the present program starts to be executed (at time $T_0$), the second loading level of the processor is monitored and recorded in step S52 automatically.

Then, in step S54, whether the second loading level matches with the first loading level in the preset period is determined. If the determining result in step S54 is "yes", step S56 is performed to increase the operating frequency so as to increase the operating speed of the processor. On the contrary, if the determining result in step S54 is "no", step S52 is performed to continue monitoring and recording the second loading level of the processor.

As shown in FIG. 2B and FIG. 2C, in practical usage, after the program is executed for a certain time (at time $T_2$), whether the curve representing the second loading level matches with the curve representing the first loading level recorded in step S50 in the preset period ($T_0$ to $T_2$) is determined automatically in step S54.

As shown in FIG. 2B, in the preset period, the curve representing the second loading level recorded in step S52 matches with the first loading level recorded in step S50. Therefore, in step S54, the present program is determined to be one of the target programs. Then, step S56 is performed to increase the operating frequency of the processor.

Furthermore, as shown in FIG. 2C, in the preset period, the curve representing the second loading level recorded in step S52 does not match with the curve representing the first loading level recorded in step S50, and thus it is determined that the present program is not the target program in step S54.

Then, step S52 is performed to continue monitoring and recording the second loading level of the processor.

Then, in step S58, when the present program is ended, the operating frequency of the processor is restored. Therefore, in the adjusting method of the invention, when the user executes designated programs, the performance of the processor is increased, and the operating frequency of the processor can be restored when the designated program is ended. This may prevent the processor from being damaged due to operating at over frequency condition for a long time. Additionally, in practical usage, the programs are usually executed in a period, and in the adjusting method of the invention, the processor may be kept at the higher operating frequency in the period, and the operating frequency of the processor does not need to be changed frequently.

Figure 3:
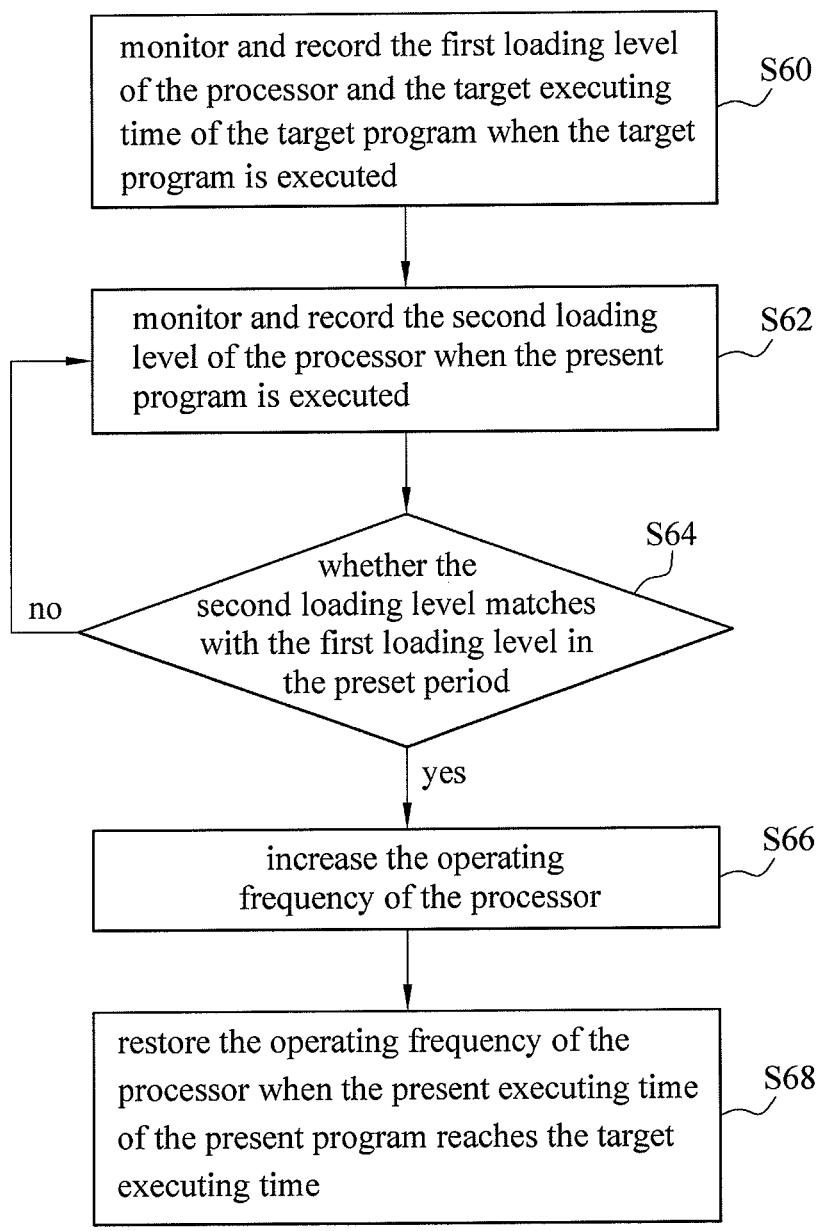
FIG. 3 is a flow chart showing the adjusting method in another embodiment of the invention.

FIG. 3 is a flow chart showing the adjusting method in another embodiment of the invention. As shown in FIG. 3, in the embodiment, the adjusting method includes the steps as follows.

First, in step S60, when the target program is executed, the first loading level of the processor and the target executing time of the target program (which is the time $T_1$ in FIG. 2A) are monitored and recorded.

Then, step S62 to S66 are performed, which are similar to step S52 to S56. Finally, in step S68, when the present executing time of the present program (namely the time $T_2$ in FIG. 2B) reaches the target executing time (that is, time $T_2$ equals to time $T_1$), the operating frequency of the processor is restored.

Figure 4:
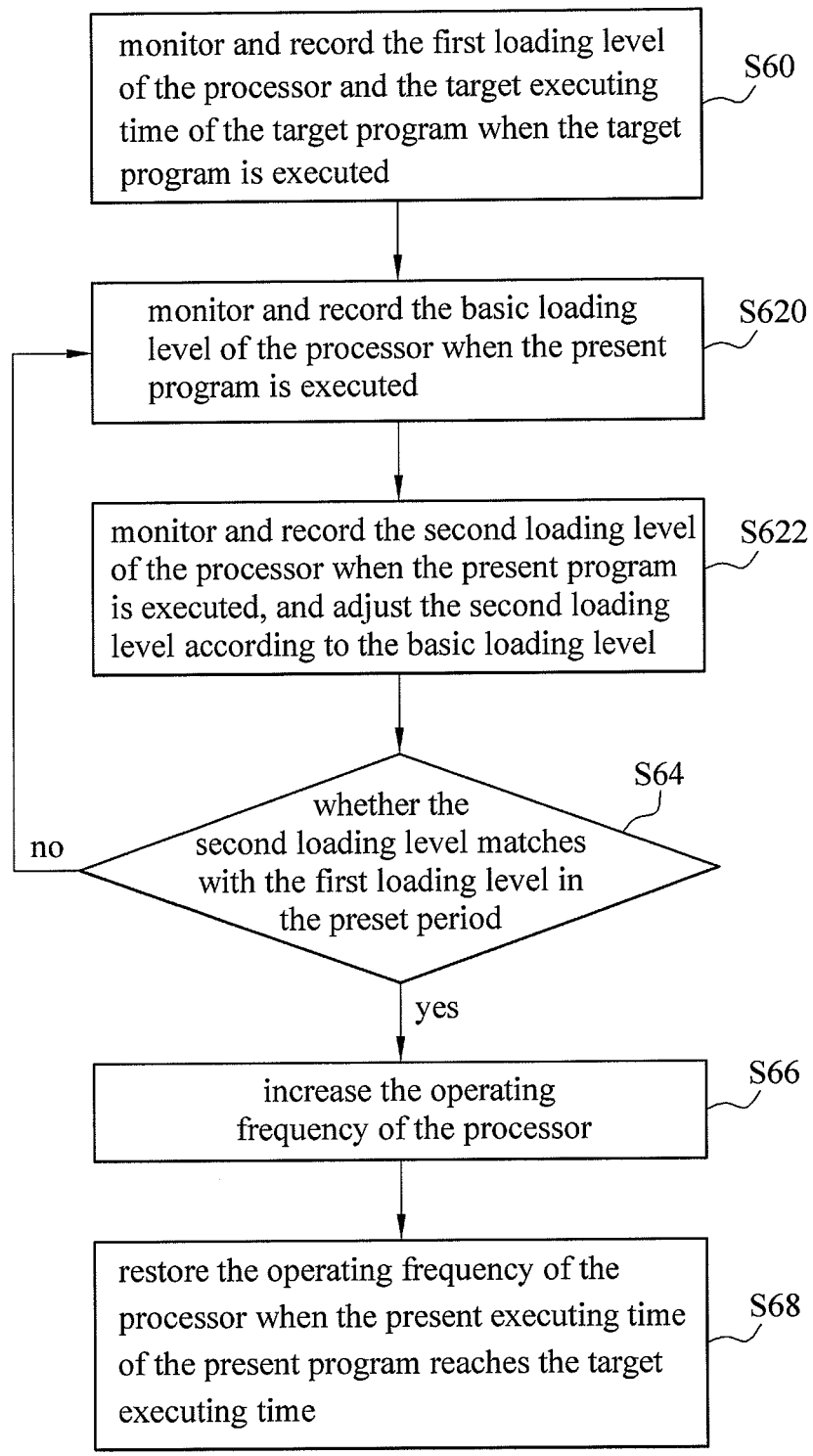
FIG. 4 is a flow chart showing step S62 in FIG. 3.

FIG. 4 is a flow chart further showing step S62 in FIG. 3. As shown in FIG. 4, step S62 further includes the steps as follows. First, in step S620, before the present program is executed, the basic loading level of the processor is monitored and recorded. Then, in step S622, when the present program is executed, the second loading level of the processor is monitored and recorded, and the second loading level is adjusted according to the basic loading level.

The operating system usually must be started first before the program is executed. At that moment, the processor starts operating, and thus the basic loading level exists. After the aforementioned adjustment, a more accurate second loading level relating to the present program can be obtained, and the subsequent determination is more accurate.

Figure 5:
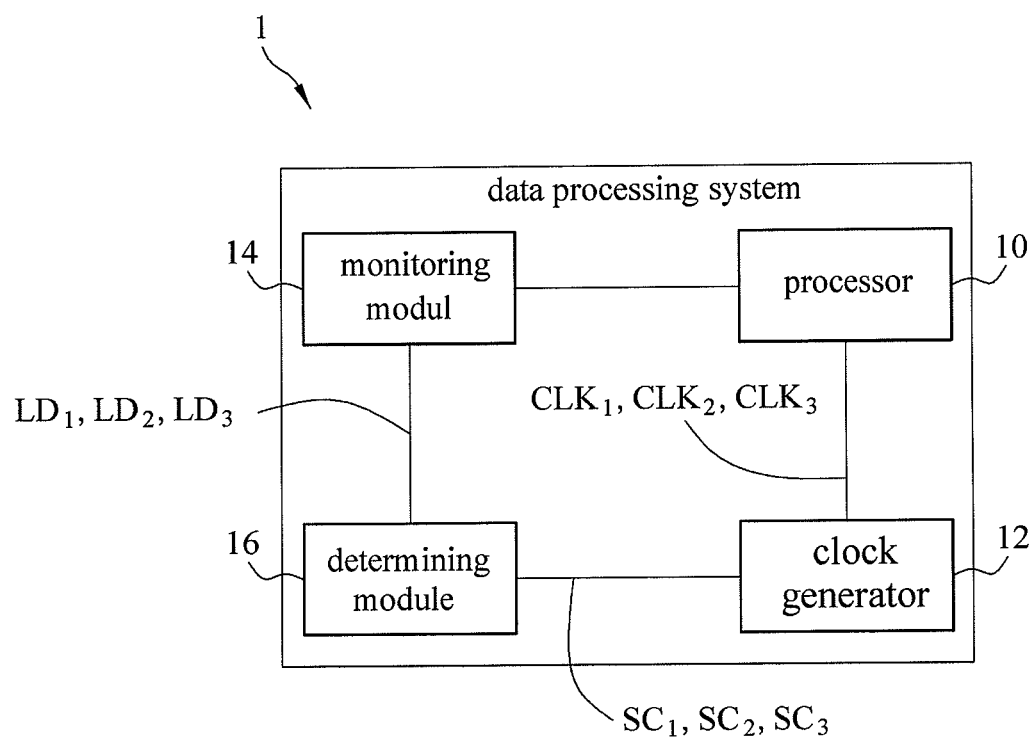
FIG. 5 is a functional block diagram showing the data processing system in an embodiment of the invention.

FIG. 5 is a functional block diagram showing the data processing system 1 in an embodiment of the invention. As shown in FIG. 5, the data processing system 1 includes a processor 10, a clock generator 12, a monitoring module 14 and a determining module 16. In addition, the clock generator 12 and the monitoring module 14 are connected to the processor 10, respectively, and the determining module 16 is connected to the clock generator 12 and the monitoring module 14.

The processor 10 such as the CPU or other processors with proper types may perform the related processing when the data processing system 1 executes the operating system or the programs. The clock generator 12 is used to generate a clock signal and transmit the clock signal to the processor 10 to adjust the operating frequency of the processor.

In addition, when a target program is executed, the monitoring module 14 monitors the first loading level of the processor 10. As mentioned above, the target program may be a game program, a drawing program, a testing program, and it is not limited thereto. In addition, the first loading level may be the amount of functions executed by the processor per unit time, or the number of times that the processor accesses a cache unit per unit time, and it is also not limited thereto. In practical usage, the monitoring module 14 may be a voltage regulating module (VRM) controller.

Furthermore, the determining module 16 receives the first loading level $LD_1$ from the monitoring module 14 and records the first loading level $LD_1$. In practical usage, the determining module 16 may include a memory unit for storing the first loading level $LD_1$. In addition, in practical usage, the determining module 16 may be an embedded controller.

When a present program is executed, the monitoring module 14 monitors the second loading level $LD_2$ of the processor 10, and then transmits the second loading level $LD_2$ to the determining module 16. The determining module 16 determines whether the second loading level $LD_2$ matches with the first loading level $LD_1$ in the preset period. If the result is "yes", the determining module 16 transmits the first control signal $SC_1$ to the clock generator 12 to make the clock generator 12 generate the first clock signal $CLK_1$ to the processor 10 to increase the operating frequency of the processor 10. On the contrary, if not, the determining module does not generate the first control signal $SC_1$, and the monitoring module 14 continues to monitor the second loading level $LD_2$ of the processor 10.

In practical usage, before the present program is executed, the determining module 16 further records the basic loading level $LD_3$ of the processor 10, and it also adjusts the second loading level $LD_2$ according to the basic loading level $LD_3$.

In practical usage, when the present program is ended, the determining module 16 transmits the second control signal $SC_2$ to the clock generator 12 to make the clock generator 12 generate the second clock signal $CLK_2$ to the processor 10 to restore the operating frequency of the processor 10. In practical usage, the determining module 16 further records the target executing time of the target program. When the present executing time of the present program reaches the target executing time, the determining module transmits the third control signal $SC_3$ to the clock generator 12 to make the clock generator 12 generate the third clock signal $CLK_3$ to the processor 10 to restore the operating frequency of the processor 10.

In practical usage, the data processing system in the invention may include a motherboard. All the processor, the clock generator, the monitoring module and the determining module may be disposed on the motherboard.

To sum up, according to the data processing system and the adjusting method disclosed in the invention, when the target program is executed, the performance of the processor may increased instantly, and the operating frequency of the processor can be restored instantly after the program is ended. This may prevent the processor from being damaged after operating in over clock condition for a long time. In addition, since the program is usually executed for a certain time, in the adjusting method of the invention, the processor can be kept at higher operating frequency for a period, and the operating frequency of the processor does not need to be changed frequently.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. An adjusting method for adjusting the performance of a data processing system with a processor, the adjusting method comprising the steps of:

monitoring and recording a first loading level of the processor when a target program is executed, and generating a first curve representing the first loading level;

monitoring and recording a second loading level of the processor when a present program is executed, and generating a second curve representing the second loading level;

determining whether the second curve representing the second loading level matches with the first curve representing the first loading level in a preset period; and increasing an operating frequency of the processor while the second curve matches with the first curve in the preset period, and the present program is one of the target programs.

2. The method according to claim 1, wherein after increasing the operating frequency of the processor, the method further comprises the step of:

restoring the operating frequency of the processor when the present program is ended.

3. The method according to claim 1, further comprising the steps of:

recording a target executing time of the target program; and restoring the operating frequency of the processor when a present executing time of the present program reaches the target executing time.

4. The method according to claim 1, wherein the target program is a game program, a drawing program or a testing program.

5. The method according to claim 1, wherein the first loading level is the amount of functions executed by the processor per unit time, or the number of times that the processor accesses a cache unit per unit time.

6. The method according to claim 1, further comprising the steps of:

monitoring and recording a basic loading level of the processor before the present program is executed; and adjusting the recorded second loading level according to the basic loading level.

7. A data processing system comprising:

a processor;

a clock generator connected to the processor;

a monitoring module connected to the processor, wherein the monitoring module monitors a first loading level of the processor and generates a first curve representing the first loading level when a target program is executed; and a determining module connected to the clock generator and the monitoring module, respectively, and receiving the first loading level from the monitoring module and recording the first loading level;

wherein the monitoring module monitors a second loading level of the processor and generates a second curve representing the second loading level when a present program is executed, and transmits the second loading level to the determining module, the determining module determines whether the second curve representing the second loading level matches with the first curve representing the first loading level in a preset period, and while the second curve matches with the first curve in a preset period, the determining module transmits a first control signal to the clock generator to make the clock generator generate a first clock signal to the processor to increase the operating frequency of the processor, and the present program is one of the target programs.

8. The data processing system according to claim 7, wherein the determining module transmits a second control signal to the clock generator when the present program is ended to make the clock generator generate a second clock signal to the processor, thereby restoring the operating frequency of the processor.

9. The data processing system according to claim 7, wherein the determining module further records a target executing time of the target program, and when a present executing time of the present program reaches the target executing time, the determining module transmits a third control signal to the clock generator to make the clock generator generate a third clock signal to the processor, thereby restoring the operating frequency of the processor.

10. The data processing system according to claim 7, wherein the target program is a game program, a drawing program or a testing program.

11. The data processing system according to claim 7, wherein the first loading-level is the amount of functions executed by the processor per unit time, or the number of times that the processor accesses a cache unit per unit time.

12. The data processing system according to claim 7, wherein before the present program is executed, the determining module records a basic loading level of the processor, and adjusts the second loading level according to the basic loading level.

* * * * *